US010397290B2

(12) United States Patent
Fan

(10) Patent No.: US 10,397,290 B2
(45) Date of Patent: Aug. 27, 2019

(54) METHOD AND SYSTEM FOR SWITCHING AND SIMULTANEOUS REPLAY OF HOME MEDIA STREAMING

(71) Applicant: INTERDIGITAL CE PATENT HOLDINGS, Paris (FR)

(72) Inventor: Wei Fan, Beijing (CN)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 37 days.

(21) Appl. No.: 15/314,612

(22) PCT Filed: May 29, 2014

(86) PCT No.: PCT/CN2014/078818
§ 371 (c)(1),
(2) Date: Nov. 29, 2016

(87) PCT Pub. No.: WO2015/180102
PCT Pub. Date: Dec. 3, 2015

(65) Prior Publication Data
US 2017/0201557 A1 Jul. 13, 2017

(51) Int. Cl.
*G06F 15/16* (2006.01)
*H04L 29/06* (2006.01)
*H04L 12/28* (2006.01)

(52) U.S. Cl.
CPC ........ *H04L 65/4076* (2013.01); *H04L 12/283* (2013.01); *H04L 12/2812* (2013.01);
(Continued)

(58) Field of Classification Search
CPC ..... H04L 65/4076; H04L 63/08; H04L 63/10; H04L 65/102; H04L 65/4084
(Continued)

(56) References Cited

U.S. PATENT DOCUMENTS 7,656,908 B1 2/2010 Begeja
8,140,699 B2 3/2012 Pickens et al.
(Continued)

FOREIGN PATENT DOCUMENTS

CN 101026742 8/2007
CN 101594594 12/2009
(Continued)

OTHER PUBLICATIONS

Cao, Lizheng, "Method, apparatus and system for switching and playing a video.", Sep. 28, 2011, Translation of CN102204219A from espacenet, pp. 1-43.*

*Primary Examiner* — Liang Che A Wang
*Assistant Examiner* — Kaylee J Huang
(74) *Attorney, Agent, or Firm* — Jeffrey M. Navon

(57) ABSTRACT

It is provided a method for switching replay of a home media streaming, wherein a first device receives a content from a source device via multicast to replay, including: receiving a request from a user to switch a device where the content is replayed from the first device to a second device; instructing the first device to unicast the content stored in the first device from the time-point of receiving the request to the second device to replay; instructing the source device to retransfer via multicast the content from the time-point; stopping receiving the unicast content from the first device when the retransferred content from the source device via multicast reaches a frame of the content being replayed at the second device; starting receiving and storing the retransferred content from the source device via multicast by the second device when the retransferred content reaches the content unicasted from the first device and stored in the second device.

6 Claims, 4 Drawing Sheets

(52) U.S. Cl.
CPC .............. *H04L 63/08* (2013.01); *H04L 63/10* (2013.01); *H04L 65/102* (2013.01); *H04L 65/1093* (2013.01); *H04L 65/4084* (2013.01); *H04L 2012/2849* (2013.01)

(58) Field of Classification Search
USPC ................................ 709/219, 217, 203, 231
See application file for complete search history.

(56) References Cited

U.S. PATENT DOCUMENTS

| | | | | |
|---|---|---|---|---|
| 2009/0164786 | A1* | 6/2009 | Sekimoto | H04N 7/17318 713/171 |
| 2009/0300185 | A1 | 12/2009 | Letellier et al. | |
| 2012/0087634 | A1 | 4/2012 | Lalwaney | |
| 2012/0185574 | A1* | 7/2012 | Cho | H04N 7/163 709/219 |
| 2013/0139210 | A1* | 5/2013 | Huang | H04W 4/06 725/109 |
| 2013/0205043 | A1* | 8/2013 | Lu | H04L 12/4633 709/244 |
| 2014/0115115 | A1* | 4/2014 | Kuang | H04L 65/1083 709/219 |
| 2015/0142968 | A1* | 5/2015 | Bhagwat | H04L 67/16 709/224 |
| 2015/0288733 | A1* | 10/2015 | Mao | H04L 65/4076 709/219 |

FOREIGN PATENT DOCUMENTS

| | | |
|---|---|---|
| CN | 101547108 | 6/2011 |
| CN | 101969431 | 6/2013 |
| CN | 103181143 | 6/2013 |
| CN | 103188524 | 7/2013 |

* cited by examiner

METHOD AND SYSTEM FOR SWITCHING AND SIMULTANEOUS REPLAY OF HOME MEDIA STREAMING

This application claims the benefit, under 35 U.S.C. § 365 of International Application PCT/CN2014/078818 filed May 29, 2014, which was published in accordance with PCT Article 21(2) on Dec. 3, 2015, in English. The PCT application is expressly incorporated by reference herein in its entirety for all purposes.

TECHNICAL FIELD

The present disclosure relates to Home Media Play and Control, and more particularly relates to a method and a system for switching and simultaneous replay of a home media streaming.

BACKGROUND ART

In the technology area of home media playing and streaming, there are already some technologies supporting media content streaming from source device A to render device B, and screen mirroring from source device A to render device B, such as AirPlay, Miracast, DLNA.

But, there exists some limitations during the ongoing playing of content from the source device A to the render device B as follows:

1) it's not easy for a new render device e.g. C or more to smoothly join the playing process together with the render device B, i.e. simultaneous play;

2) it's not easy for a new render device e.g. C or more to uninterruptedly switch the playing process from the render device B to the other render device C.

For limitation 2), there probably exist some solutions, e.g. including steps of;

a) stop the playing process from the source device A to the render device B. And the stop point was recorded somewhere which is then notified to C;

b) the render device C is triggered to play the same media content from A;

c) the render device C seeks the last stop point of the media content previously played at the render device B; and d) a new unicast connection is established between the source device A and the render device C to continuously streaming and playing the media content.

This above typical streaming redirecting technology in fact initiates a new playing streaming from the source A to the render device C. It involves some interruption of the play process, even though probably the hardware (HW) performance of the source device A and the render device C can be powerful enough to reduce the interruption impact to user experience.

Besides, the above typical solution is also not easy to support or resolve the above limitation 1), that is, dynamically joining/leaving for multi-screen simultaneous playing.

Some other screen switching technology is mirroring, i.e. to capture the source device A's screen image/frame and send it to the render device B or C for real-time displaying. This technology requires very powerful HW capability of dedicated GPU (Graphics Process Unit) in both devices, which will raise the device cost. Besides, this technology also has its inherently drawback of graph quality loss during the encoding and decoding of captured screen frame.

SUMMARY

According to an aspect of the present invention, it is provided a method for switching replay of a home media streaming, wherein a first device receives a content from a source device via multicast to replay, including: receiving a request from a user to switch a device where the content is replayed from the first device to a second device; instructing the first device to unicast the content stored in the first device from the time-point of receiving the request to the second device to replay; instructiong the source device to retransfer via multicast the content from the time-point;

stopping receiving the unicast content from the first device when the retransferred content from the source device via multicast reaches a frame of the content being replayed at the second device; starting receiving and storing the retransferred content from the source device via multicast by the second device when the retransferred content reaches the content unicasted from the first device and stored in the second device.

According to another aspect of the present invention, it is provided a system for switching replay of a home media streaming, wherein a first device receives a content from a source device via multicast to replay comprising a processor configured to implement: receiving a request from a user to switch a device where the content is replayed from the first device to a second device; instructing the first device to unicast the content stored in the first device from the time-point of receiving the request to the second device to replay; instructing the source device to retransfer via multicast the content from the time-point; stopping receiving the unicast content from the first device when the retransferred content from the source device via multicast reaches a frame of the content being replayed at the second device; starting receiving and storing the retransferred content from the source device via multicast by the second device when the retransferred content reaches the content unicasted from the first device and stored in the second device.

It is to be understood that more aspects and advantages of the invention will be found in the following detailed description of the present invention.

BRIEF DESCRIPTION OF THE DRAWINGS

The accompanying drawings, which are included to provide a further understanding of the invention and are incorporated in and constitute a part of this application, will be used to illustrate an embodiment of the invention, as explained by the description. The invention is not limited to the embodiment.

In the drawings.

DESCRIPTION OF EMBODIMENTS

In the following description, various aspects of an embodiment of the present invention will be described. For the purpose of explanation, specific configurations and details are set forth in order to provide a thorough understanding. However, it will also be apparent to one skilled in the art that the present invention may be implemented without the specific details present herein.

In home network, at the connection establishing phase of a streaming between two devices (from a source device to a play device), the source device should notify home gateway with the media file's distinct hash value as key of media index, and the multicast IP address and port applied for this stream transporting as well as streaming ID for the streaming to be multicast and the source device IP. With this streaming's tracking information, the home gateway can uniquely identify and find the media file's metadata and management policy information from converged media index database stored in the home gateway or some other places for all home media contents. The hash value is calculated based on the media file's path and filename information, and the device ID. The hash value is unique to each media file in home's all media devices. Each device synchronizes its local media file index to the home gateway having the converged media index database, which has a converged overall media index information of all home media files. The management policy could be like, e.g., which type of media is not allowed to be streamed and played to other devices if without specific authentication. Thus a streaming between home devices can be dynamically managed by pre-defined policy like parental control.

The multicast IP address and port are dynamically assigned by the source device or the home gateway to multicast the stream to other home network devices. The streaming ID is dynamically assigned by the source device uniquely marking the streaming to be multicast. Any other devices connected to the home network can connect to the home gateway with necessary authentication and be able to browse and search all current ongoing streaming tracking information including metadata, multicast IP, port, and streaming ID. And, a device in the home network can dynamically request to join a streaming process by just listen and receive that multicast streaming for that media file. It's also possible to require some authentication for joining an ongoing stream. Then, other device can dynamically enjoy the media playing, or just supervise it and take some additional control e.g. stop and forbid it from being streamed between devices. The above processing is explained hereinafter.

Figure 1:
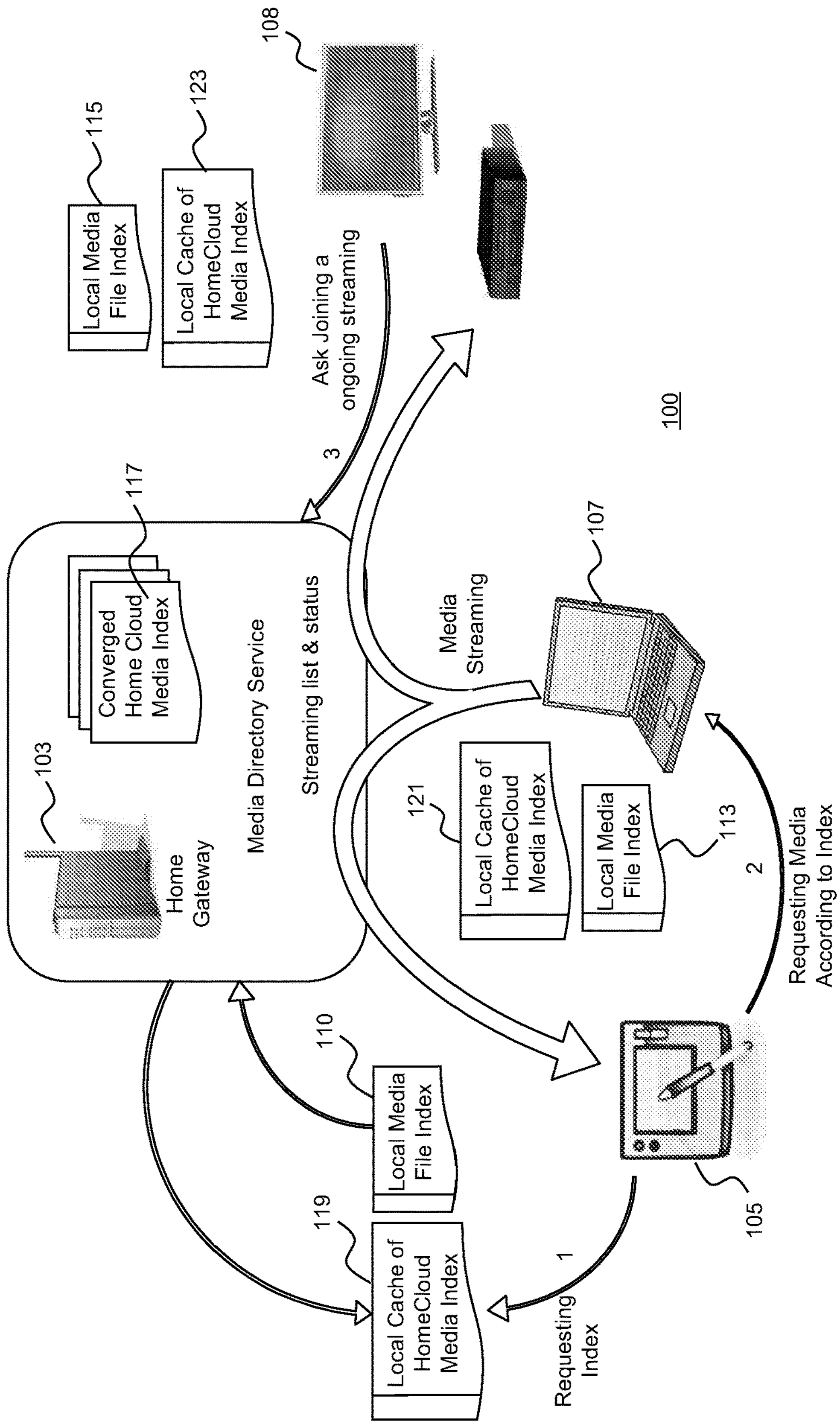
FIG. 1 is a diagram illustrating media streaming between devices according to the embodiment of the invention.

In FIG. 1, home network 100 includes the first device 105 having the first local media file index 110, the second device 107 having the second local media file index 113, the third device 108 having the third local media file index 115, and home gateway 103. All home media devices 105, 107, 108 generate their local media file index 110, 113, 115 according to a pre-defined procedure and format, and synchronize them to the home gateway 103. Based on that, the home gateway 103 locally maintains a converged home cloud media index 117 and keeps it accessible to all home media device 105, 107, 108. With the home cloud media index 117, each device can browse media information stored in other devices. Each of the first, second, and third device 105, 107, 108 has the first, second, and third local cache of home media index 119, 121, 123, respectively.

When a user of the first device 105 requests media index to the first local cache of home cloud media index 119 and wants to play a media file stored in the second device 107, the user of the first device 105 sends a request to the second device 107. The second device 107 authenticates the request (could further via the home gateway) and dynamically assign a multicast IP (or assigned by the home gateway) and port for the streaming to be multicast.

The second device 107 notifies the first device 105 with that multicast IP and port. The first device 105 is ready to listen, receive the stream data, and replay it locally. Meanwhile, the second device 107 notifies the home gateway 103 with that media file's hash value, the generated multicast IP and port for the streaming to be multicast, the source device IP, and the dynamically generated streaming ID. Besides, the second device 107 also notifies the home gateway 103 that this request is from the first device 105. The first device 105 then waits for the home gateway's confirmation to allow the streaming from the second device 107 to the first device 105. The home gateway 103 receives this streaming tracking information and searches the media file's metadata and corresponding management policy in the gateway's local database. With a policy checking, it requires further authentication since this video is not for everyone in home. The first device 105 receives the authentication request from the home gateway 103 and responses with valid privilege information. Then, after the authentication, the home gateway 103 notifies the second device 107 that this streaming can be started. The home gateway 103 sends to the first and second devices 105, 107 with a pair of security keys to encrypt and decrypt the steaming data since the video is not open for everyone. The first device 105 then successfully replays the stream from the second device 107.

During the streaming, the user of the third device 108 finds that there is an ongoing streaming in home network 100 between the first and second devices. After authentication, the user of the third device C takes a check with the streaming metadata information. If the user of the third device 108 wants to have a further supervise over the playing contents, he/she requires a request to join the multicast streaming process. After a further authentication for the streaming request, the third device 108 receives a key from the home gateway 103. And then the third device 108 successfully joins the streaming and replays the content locally. The third device 108 now is also able to take control over the streaming e.g. pause, stop. This is a basic concept for simultaneous play between a source device and a plurality of render devices. It will be described in details below.

Figure 2:
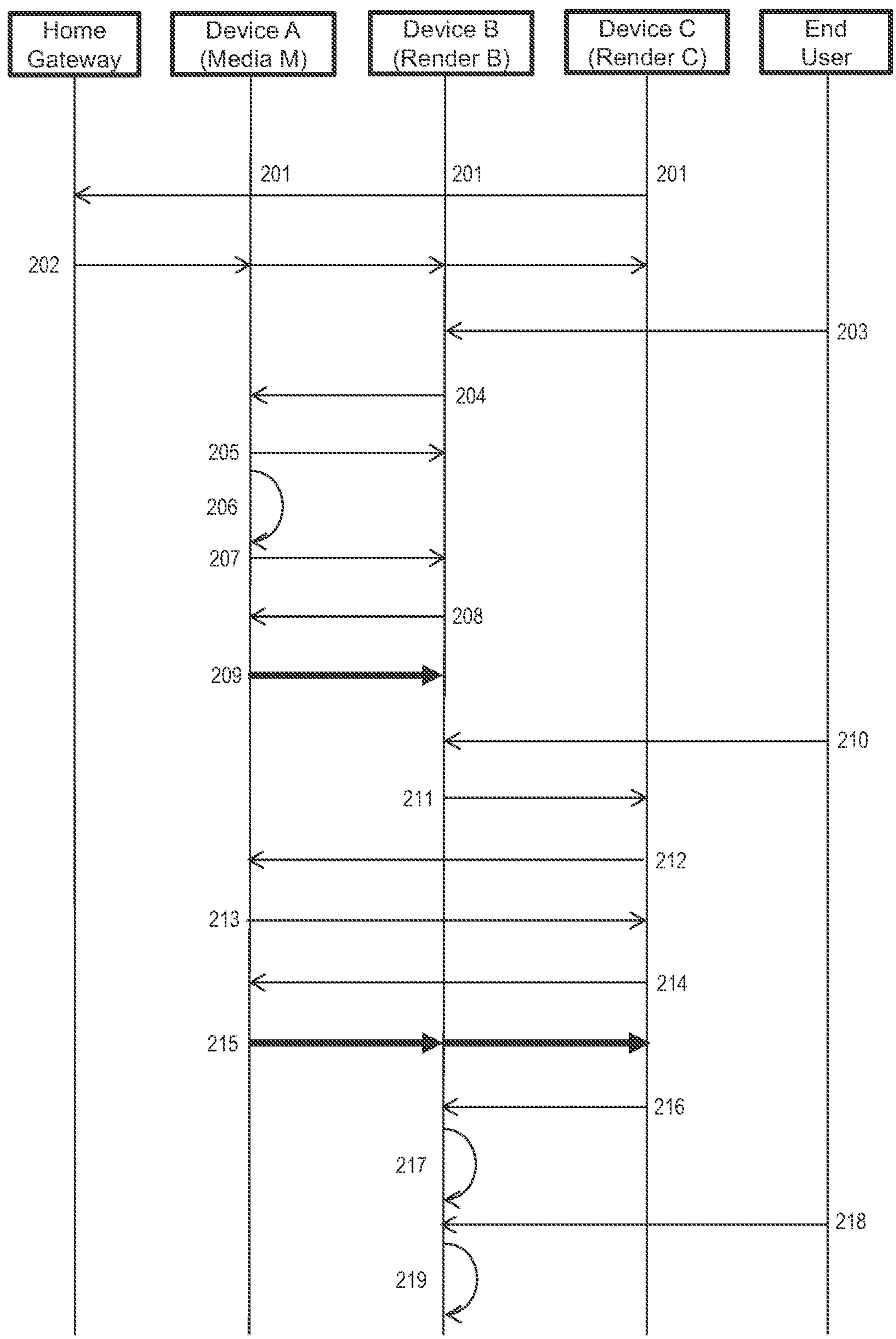
FIG. 2 is a system chart of home media streaming switching and synchronizing play according to the embodiment of the present invention.

FIG. 2 describes an embodiment of home media streaming switching and synchronizing play. At step 201, device A, device B, and device C registered to HGW (Home Gateway) when they are connected to the HGW. At step 202, the HGW assign a multicast IP for the device A to use for media transferring, and synchronize its home media index to the devices B and C. At step 203, a user finds an interesting media M stored on the device A via home cloud media index, and selects (e.g. clicks) to replay it at the device B. At step 204, the device B requests to replay the media M from the device A, and provides its certificate the media ID for authentication and authorization. At step 205, the device A authenticates and authorizes the device B and sends back a key which is dynamically generated for the media M to the device B for media decryption. At step 206, the device A dynamically selects a (socket) port for the media M transferring, and generates a streaming ID X to transfer the media M. At step 207, the device A notifies the device B with its multicast IP and port to be used for transferring the media M, as well the streaming ID X. At step 208, the device B prepares to receive the media M at the multicast IP and port, and sends ACK to the device A. At step 209, the device A starts to send the media M to the device B through the multicast IP, and the device M is replay at the device B. At step 210, since the user wants to go into bed room where the device C is located, the user requests to transfer the playing of the media M to the device C. At step 211, the device B notifies the device C of the device A's IP and the streaming ID X at the device A that is now used for the media M transferring. Also the device B notifies the device C of the current play progress point. It should be noted that this is necessary since the transfer speed is faster than playback speed.

At step 212, the device C provides its certificate and the streaming ID X to the device A for authentication & authorization, and requests to replay its media content of the streaming ID X. The device C also provides the play progress point information to the device A. At step 213, the device A authenticates and authorizes the device C, and sends the key to the device C for the media M's decryption, together with the multicast IP and port of streaming ID X. Meanwhile, the media M is still replayed at the device B continuously, or can be paused dependent on user's selection. At step 214, the device C has prepared to receive the media M at the Multicast IP and port, and sends ACK to the device A. At step 215, the device A starts to retransfer the media M from the notified current play progress point through the multicast IP. Then the media M is replayed at the device C. At step 216, the device C notifies the device B that the playing transfer has completed. At step 217, the device B also receives this retransferred content, and found it has been buffered locally, so can just ignore and doesn't buffer it again. It depends on user's input (selection) whether the device B will continue to play the media M together with the device C. At step 218, the user was notified that the content playing transferring has been completed, then stops and turns off the device B to go into bed room to watch the media M at the device C. It should be noted that he can also choose to keep the playing on the device B. At step 219, if the use wants the device B to continuously play the media M together with the device C, the device B will keep buffering and playing the new content of the media M after the duplicated content has been transferred to the device C.

Figure 3:
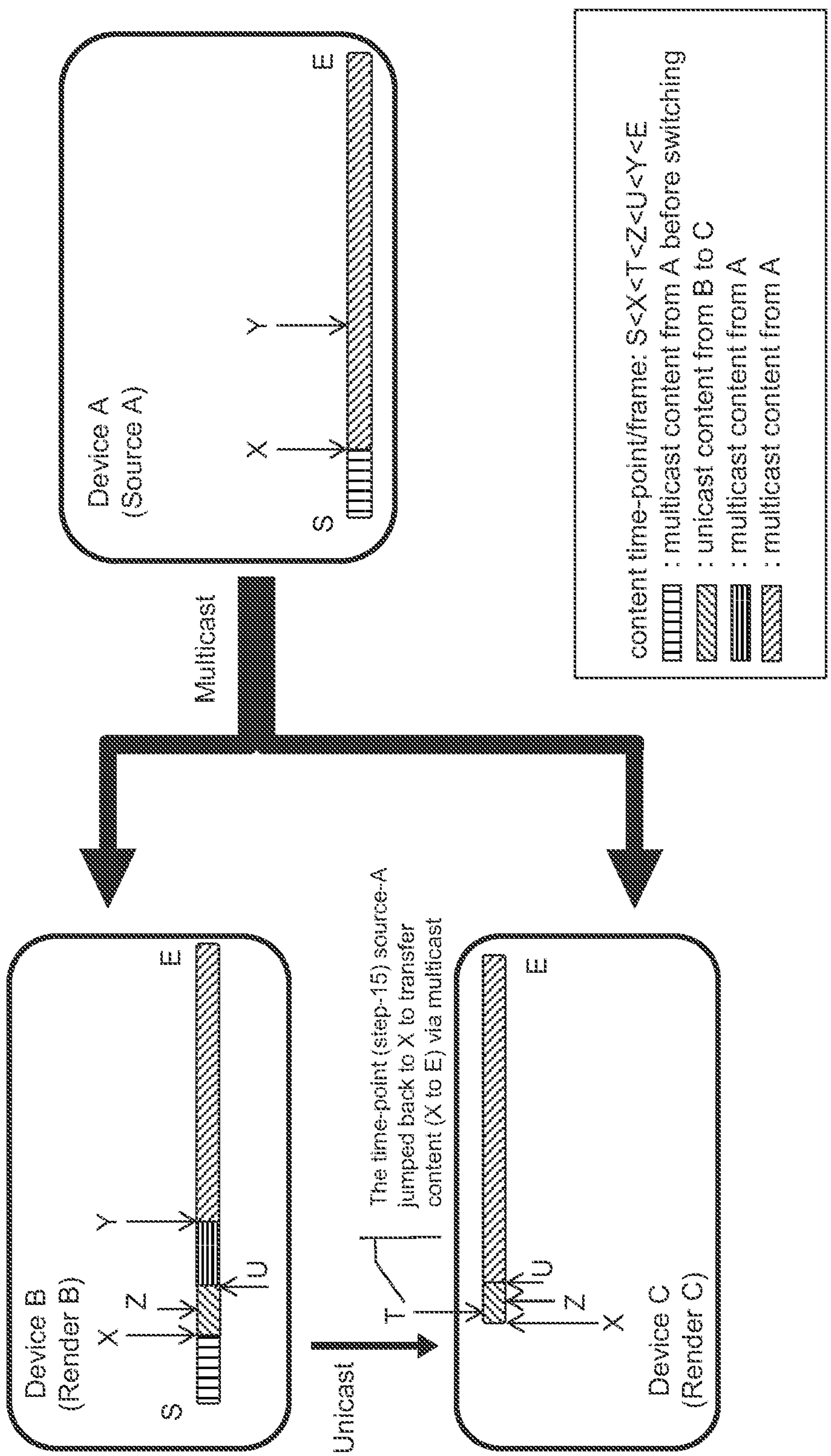
FIG. 3 is a system chart illustrating the procedure to speed up the play switching or joining of device according to the embodiment of the present invention.

FIG. 3 illustrates an embodiment to speed up the play switching or joining of device C. In order to speed up the play switching or joining of the device C, the following steps can be further implemented.

1. In the step 209 of FIG. 2, the device A multicasts the content (i.e. media A), and only the device B is receiving and replays it.

2. In the step 210 of FIG. 2, the device B receives a command to switch the content to the device C. And at that moment on the device B, the content has been played to time-point X, while received (via multicast) content has been buffered to time-point Y (i.e. in the duration between the step 209 to 210, the content from time-point S to the time-point Y has been transferred and buffered on the device B, and the device B is playing time-point/frame X of the content at the moment of the step 210 begins).

3. During the process from the step 211 to 214 of FIG. 2, the device B initiates a unicast connection to the device C, and, via this unicast connection, the device B starts to transfer its buffer content from time-point X to the device C so that the device C can replay the content as soon as possible.

4. At step 215 of FIG. 2, the device A jumps back to the content at time-point X, and transfers the content from this time-point X via multicast. When the step 215 begins, some content from time-point X has been transferred via unicast from the device B to the device C and was buffered in the device C. At the moment, the device C is just playing the time-point/frame T of the content stored in the device C. Since some content from time-point X has been transferred from the device B via unicast and has been buffered in the device C, the device C doesn't cache the duplicated content transferred from the device A over multicast.

5. When the device C is playing content of time-point Z, the transferred content from the device A over multicast just catches up the playing content of time-point Z. It should be noted that transferring speed is faster than playback speed. Thus the device C no longer need to receive the unicast content from the device B, and now in fact content from the time-point X to time-point U has been transferred from the device B to the device C via unicast and been buffer in the device C. Then the device B can select to stop and exit, or keep simultaneous play. (We here just assume B keeps simultaneous play in following steps.)

6. Since the content from the time-point Z to the time-point U has been transferred via unicast from the device B and buffered in the device C, the device C won't/needn't buffer the content from the time-point Z to the time-point U transferred from the device A via multicast. And after the device A's multicast transferring reaches the content at the time-point U, the device C will start to buffer the content.

7. On the device B (we assume the device B selects to continue simultaneous play), since the content from the time-point X to the time-point Y has been buffered, thus, the device B won't buffer this duplicated content transferred from the device A via multicast. And after the device A's multicast transferring reaches the content at time-point Y, the device B will start to buffer it.

Figure 4:
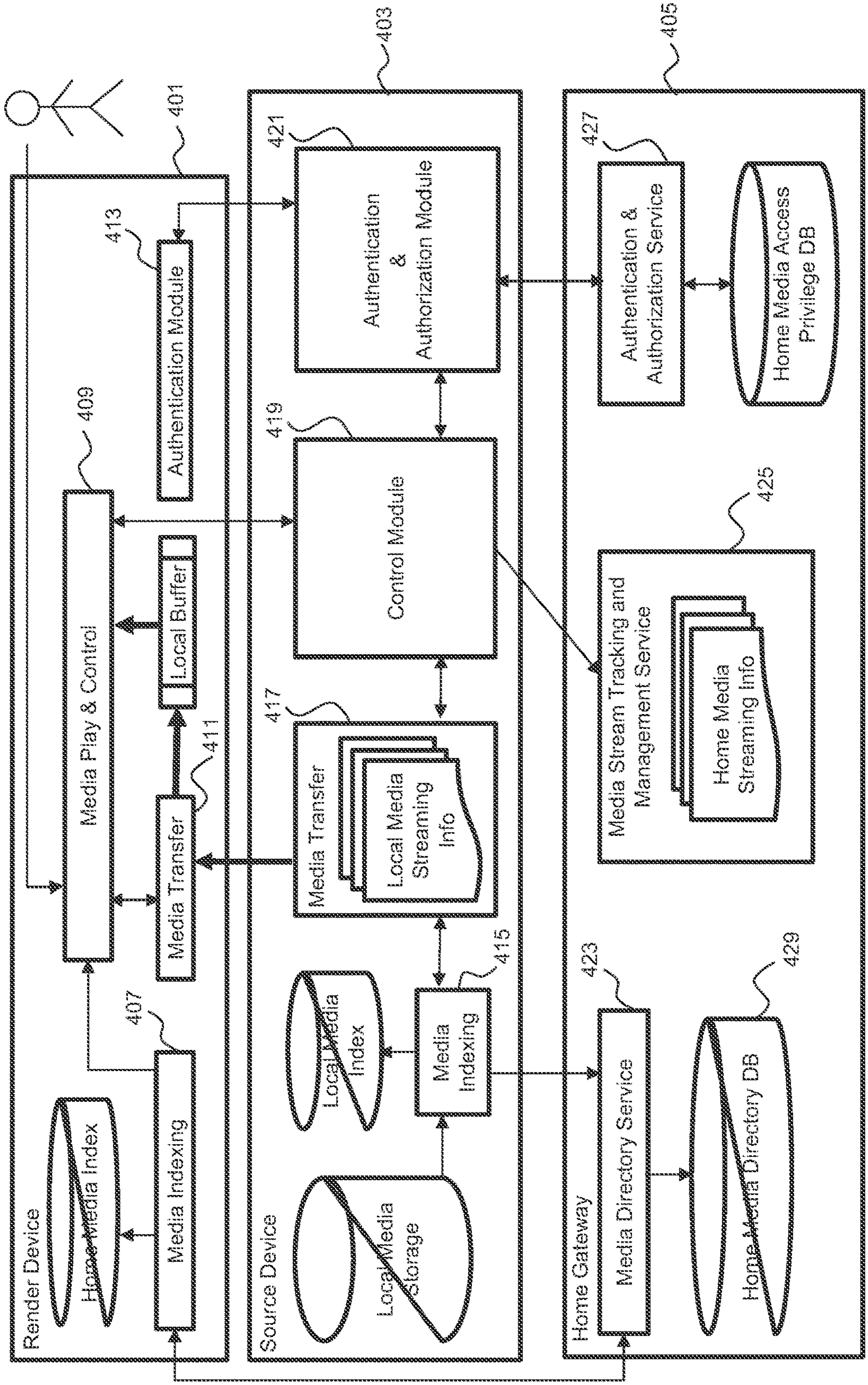
FIG. 4 is a diagram illustrating devices according to the embodiment of the present invention.

FIG. 4 shows devices included in home media network. The home media network typically includes three types of device: render device 401, source device 403, and home gateway 405.

1. render device 401: it typically includes the modules of media Indexing 407", media play & control 409, media transfer 411, authentication module 413.
   a) media indexing 407: It's responsible to synchronize the home cloud media index 415 from the Home Gateway (HGW), by interoperating with the HGW's "media directory service". And, the home media index is stored locally for user browser and access.
   b) media play & control 409: It presents the home cloud media index 415 onto screen for end user. It follows to end user's play command, and interoperates with the source device's control module 419, requests to access specified media from the source device 403. And it reads the buffered media content from the media transfer module 411, and plays it onto screen for end user.
   c) media transfer 411: It receives the transferred content from the source device 403 via the notified multicast IP and port and buffers it locally for the media play & control 409 module to play.
   d) authentication module 413: Upon the request from the media play & control module 409, it provides its certificate and the request media hash index or streaming ID to the source device 403, and asks for authentication and authorization for this media's access. The authentication and authorization results are notified to the media play & control module 409. And if it's succeeded, the media play & control module 409 also gets notification about the multicast IP and port from the source device's control module 419. And then, the media play & control module 409 notifies the media transfer module 411 to prepare to receive the content to be transferred from the source device.
2. source device 403: It typically includes the modules of media Indexing 415, media transfer 417, control module 419, and authenticate & authorization module 421.
   a) media Indexing 415: It searches the local stored media contents, and generates index of them. The index is stored locally, meanwhile, it is synchronized to the Home Gateway via interoperates with its "media directory service 423" which constructs the overall home media index.

b) control module 419: Upon transfer request from the render device 401, and after the success authentication result notification from the authentication module 421 of this source device, it prepare and starts to transfer the specified media content to the render device 401. The preparation actions include:

i. Notify the media transfer module 417 to generate the streaming ID and the transfer port for this media streaming.

ii. Then send this returned stream ID and transfer port together with the multicast IP assigned by the HGW or this source device 403 to the render device's media play & control module 409.

iii. Besides, it sends this stream ID and the source device IP and the render device IP to HGW. The stream ID and the source device IP is then cached by HGW's media stream tracking and management service 425.

c) media transfer 417: Upon the request from the control module 419 to generate the stream ID for this media streaming and the transfer port, it returns these information to the control module 419. And, it locates the requested media through local the media indexing module 415, reads the content and transfers it to the render device. Besides, it caches/stores the streaming ID, transfer port, and media ID locally into the "local media streaming Info".

d) authentication & authorization module 421: Upon the request from the render device 401, it passes this request information to the HGW's authentication & authorization service 427. HGW then firstly authenticates whether this is a valid requester in the home cloud, if authenticated, and then check whether the requester has the authorization to access this media ID's content. The authentication and authorization results are returned back to the render request device, and corresponding preparation is performed at the source device if it succeeded.

3. home gateway 405: It typically includes media directory service 423, media stream tracking and management service 425, and authentication & authorization service 427.

a) media directory service 423: It receives the update of each source device's local media index, and stores them into the home media director DB 429. And it also synchronizes these updated changes of each source device's media index to each render devices 401 in the home.

b) media stream tracking and management service 425: Upon the notification of ongoing media streaming information from the source device 403, it records each ongoing media streaming in the home. The media streaming information reported by the source device 403 should include:

i. stream ID: generated by the source device 403 for the media streaming it transfers.

ii. source device IP: the IP of the source device 403.

iii. render device: the IP of the render device. If multiple render devices there are, then each IP should be reported.

c) Authentication & Authorization Service 427: It receives the authenticating and authorizing request forwarded from the source device 403 that is originated from the render device 401. And, it checks the provided certificate to the "home media access privilege DB". Then, it returns the check result to the source device 403.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention as defined by the appended claims.

The invention claimed is:

1. A method for switching play of a media streaming, wherein a first device receives content from a source device via multicast to play, the method comprising:

receiving a request to switch from the first device to a second device to play the content;

instructing the first device to unicast the content stored in the first device from a time-point of receiving the request to play the content at the second device;

retransferring via multicast the content from the source device to both the first device and the second device from the time-point;

instructing the second device to stop receiving the unicasted content from the first device when the retransferred content from the source device reaches a point in time of the content play that is synchronized with a same point in time of the content being played at the second device;

instructing the second device to start receiving and storing the retransferred content from the source device via multicast when the retransferred content reaches a point in time that is synchronized with the content unicasted from the first device and stored in the second device; and when the content is played at the first device simultaneously with the second device, starting receiving and storing the retransferred content by the first device when the retransferred content reaches a point in time that is synchronized with the content stored in the first device.

2. The method of claim 1, wherein the first device, the second device and the source device are registered to a gateway, and the media is multicast using a multicast IP and port for the content assigned by the gateway or the source device.

3. The method of claim 1, wherein the retransferring is implemented after the source device performs authentication and authorization of the second device.

4. A source device configured to switch play of a media streaming, wherein a first device receives a content from the source device via multicast to play, the device comprising a processor and associated memory configured to:

receive a request to switch from the first device to a second device to play the content;

instruct the first device to unicast the content stored in the first device from a time-point of receiving the request to play the content at the second device;

retransfer via multicast the content from the source device to both the first device and the second device from the time-point;

instruct the second device to stop receiving the unicasted content from the first device when the retransferred content from the source device reaches a point in time of the content play that is synchronized with a same point in time of the content being played at the second device;

instruct the second device to start receiving and storing the retransferred content from the source device via multicast when the retransferred content reaches a point in time that is synchronized with the content unicasted from the first device and stored in the second device; and when the user keeps play of the content at the first device simultaneously with the second device, starting receiving and storing the retransferred content by the first device when the retransferred content reaches a point in time that is synchronized with the content stored in the first device.

5. The source device of claim 4, wherein the first device, the second device and the source device are registered to a gateway, and the media is multicast using a multicast IP and port for the content assigned by the gateway or the source device.

6. The source device of claim 4, wherein the retransferring is implemented after the source device performs authentication and authorization of the second device.

* * * * *